（12）United States Patent
Shan

(10) Patent No.: US 7,454,837 B2
(45) Date of Patent: Nov. 25, 2008

(54) EFFORT-SAVING GARDENING SHEARS

(75) Inventor: Su-Hua Shan, Taipei (TW)

(73) Assignee: Natura Innovation Ltd., Port Louis (MU)

( * ) Notice: Subject to any disclaimer, the term of this patent is extended or adjusted under 35 U.S.C. 154(b) by 0 days.

(21) Appl. No.: 11/581,136

(22) Filed: Oct. 14, 2006

(65) Prior Publication Data

US 2008/0086892 A1 Apr. 17, 2008

(51) Int. Cl.
*B26B 13/28* (2006.01)
*B26B 13/00* (2006.01)

(52) U.S. Cl. .......................................... 30/254; 30/251

(58) Field of Classification Search ........... 30/131–135, 30/244, 245, 249, 250, 251, 254, 261, 177, 30/185, 196, 237; 81/358, 411
See application file for complete search history.

(56) References Cited

U.S. PATENT DOCUMENTS

| 2,727,417 | A | * | 12/1955 | Eifel | 81/411 |
| 2,816,359 | A | * | 12/1957 | Hogue et al. | 30/239 |
| 3,688,405 | A | * | 9/1972 | Dutra et al. | 30/135 |
| 4,241,503 | A | * | 12/1980 | Sugiyama | 30/268 |
| 6,311,588 | B1 | * | 11/2001 | St. John et al. | 81/409 |
| 6,829,829 | B1 | * | 12/2004 | Huang | 30/252 |
| 7,127,819 | B1 | * | 10/2006 | Huang | 30/92 |
| 2003/0079576 | A1 | * | 5/2003 | Lo | 81/318 |
| 2006/0277764 | A1 | * | 12/2006 | Hsien | 30/245 |

* cited by examiner

*Primary Examiner*—Jason D Prone
*Assistant Examiner*—Joseph Defrank
(74) *Attorney, Agent, or Firm*—Charles E. Baxley

(57) ABSTRACT

A pair of effort-saving shears primarily comprises: a first shear element having a combining portion with a pivot hole and a shear element combining hole thereon, and a first handle further attached to the first shear element; a second shear element having combining portion with a shear element combining hole; a handle shaft axially positioned in a second handle and having a combining portion at one end; an effort-saving transmission assembly including a toothed block fixed on one side of the combining portion of the handle shaft, and a toothed hole provided on the combining portion of the second shear element, wherein the toothed hole enclose and partially engage the toothed block by parts of the teeth thereof; and wherein the combining portion of the first shear element overlaps the combining portion of the second shear element; a pivot member, piercing through said pivot holes to be placed between the toothed hole and the toothed block; and a shear element combining pin piercing through said shear element combining pin holes.

2 Claims, 8 Drawing Sheets

EFFORT-SAVING GARDENING SHEARS

BACKGROUND OF THE INVENTION

1. Technical Field

The present invention relates to gardening shears and, more particularly, to a pair of shears having an effort-saving assembly for one-hand holding and operating.

2. Description of Related Art

A pair of conventional gardening shears, as shown in FIG. 1, typically comprises two shear elements wherein one shear element may be movable while the other may be relatively fixed and the two shear elements are crosswise combined at a pivot member. Further, one handle may be attached to each shear element at the end beyond said pivot member. When operating such conventional gardening shears, a user squeezes both handles with single hand to drive the shear elements to approach each other and a shearing force can therefore be generated for pruning branches or stems of plants.

However, foresaid conventional gardening shears may have defects as described below.

Since the shearing force of the shears utterly is derived from the user's squeezing force exerted on the handles, the user may have to implement his extreme strength to operate the shears, and it can be difficult for the user to hole the handles stably while exerting such excessive squeezing force. Thus, such difficult operation may in turn render undesirable sway, shakiness or deviation of the shears during shearing and as a result, roughness or even tears may occur at the cut of objective branch.

Further, when the excessive shearing force is imposed on the branches or stems under said excessive squeezing force, an excessive counterforce may be correspondingly incurred from the sheared branch to damage the pivot member and detrimental clearance between the shear elements may successively arise to weaken the shearing force of the shears. Eventually, the shears can undesirably become unusable soon.

SUMMARY OF THE INVENTION

The present invention has been accomplished under the circumstances in view to provide a pair of effort-saving shears which primarily comprises:

a first shear element having a blade portion at one end, a combining portion at the opposite end comprising a pivot hole and a shear element combining hole, and a first handle further attached to the first shear element;

a second shear element having a blade portion at one end, and a combining portion at the opposite end comprising a shear element combining hole;

a handle shaft axially positioned within a second handle and having a combining portion at one end;

an effort-saving transmission assembly including a toothed block fixed on one side of the combining portion of the handle shaft, and a toothed hole provided on the combining portion of the second shear element, wherein the toothed hole and toothed block include a tooth respectively, and the combining portion of the second shear element overlaps the combining portion of the handle shaft to make the toothed hole enclose and engage the toothed block in part with the teeth of both the toothed hole and toothed block while the combining portion of the first shear element overlaps the combining portion of the second shear element;

a pivot member, piercing through the pivot holes of the first shear element and the handle shaft, and being positioned between the toothed hole and the toothed block based on the sides thereof opposite to the teeth thereof; and a shear element combining pin, piercing through the shear element combining hole of said first and second shear elements.

It is one object of the present invention to provide a pair of one-hand operating shears equipped with an effort-saving transmission assembly to achieve effortless operation of the gardening shears.

It is another object of the present invention to provide a pair of effort-saving gardening shears characterized by the stable, smooth and durable operation which is accomplished by utilizing the variation of the engagement between the teeth of the toothed block and the toothed hole of the effort-saving transmission assembly to scatter the shearing force and counterforce imposed on the pivot member of the shears.

It is still another object of the present invention to provide a pair of effort-saving gardening shears which are secured against overextending or improper closing because the full open angle and close angle thereof are confined by said effort-saving transmission assembly.

DETAILED DESCRIPTION OF THE PREFERRED EMBODIMENT

Figure 1:
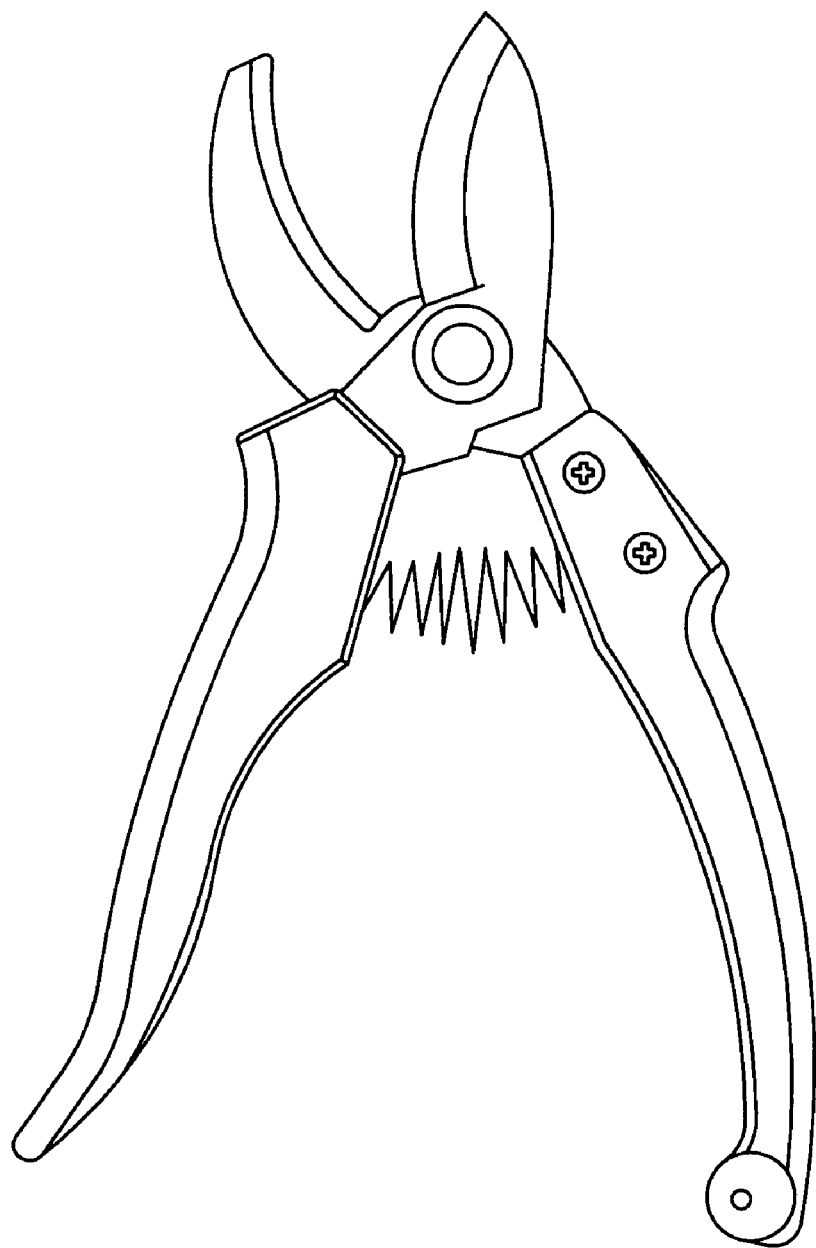
FIG. 1 is a plan view of a pair of conventional gardening shears.
Figure 2:
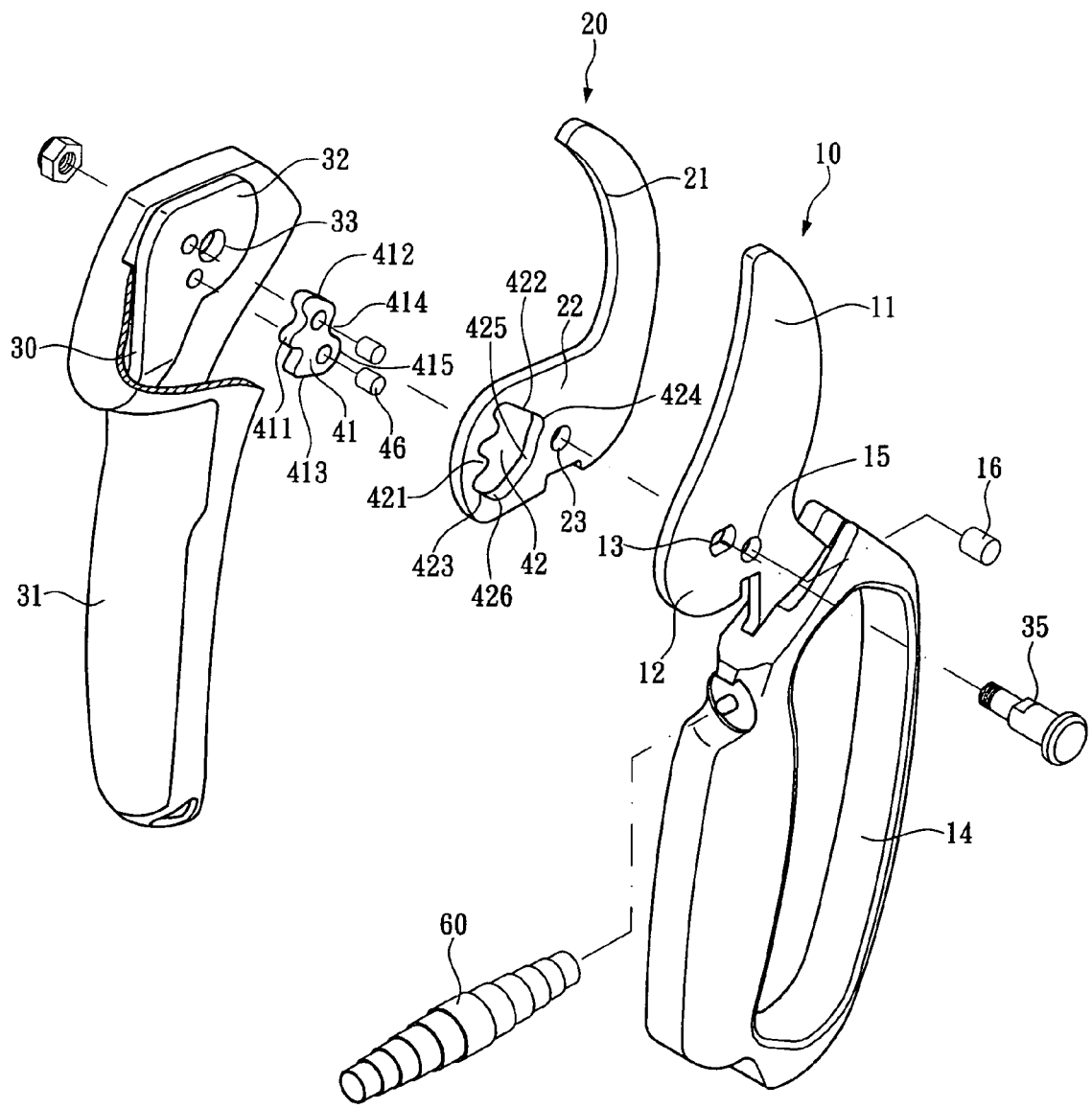
FIG. 2 is a first exploded view of the effort-saving shears according to the present invention.
Figure 3:
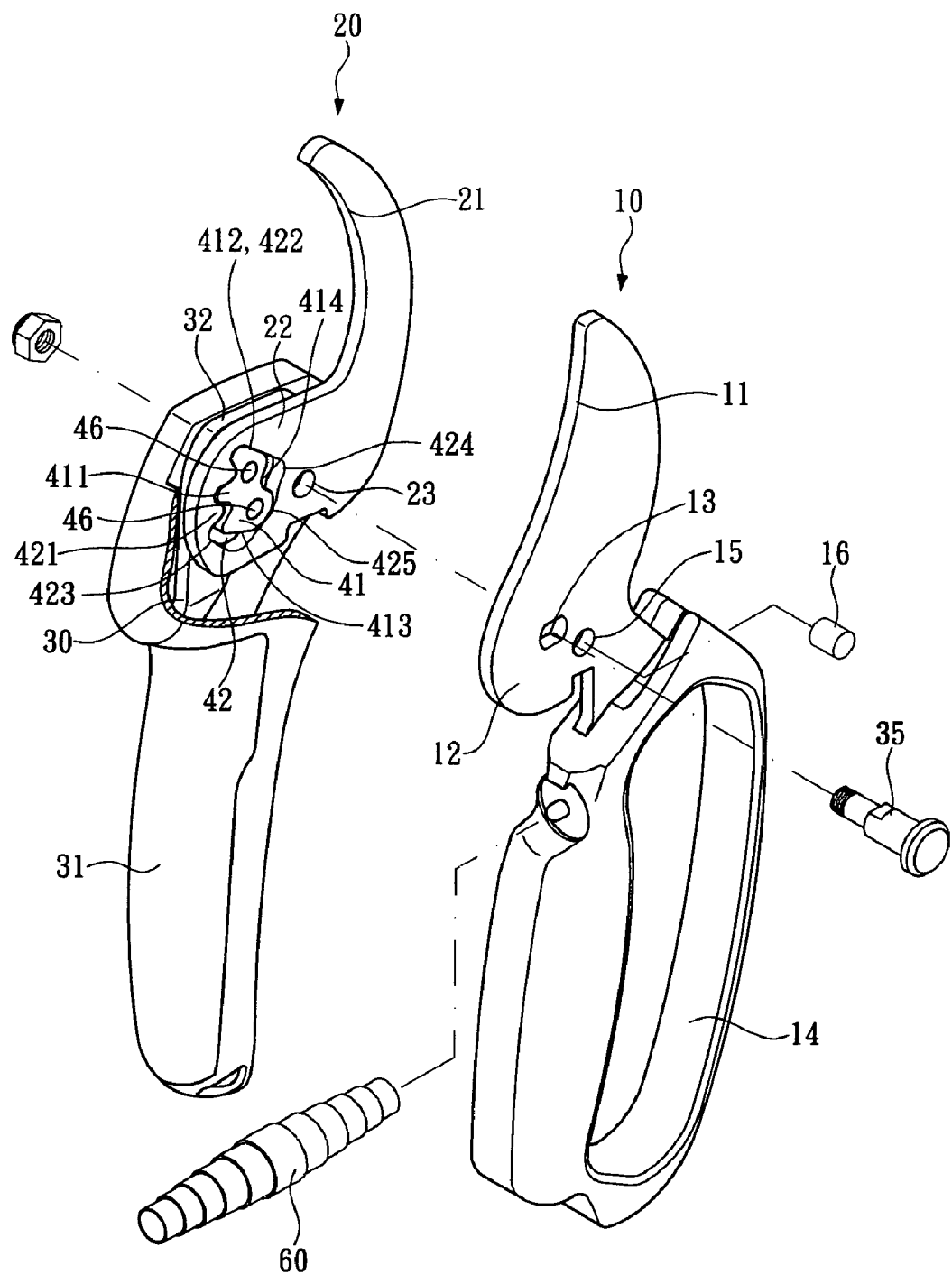
FIG. 3 is a second exploded view of the effort-saving shears according to the present invention.

As shown in FIGS. 2 and 3, an embodiment of the disc lose d effort-saving shears primarily comprises:

a first shear element 10 having a blade portion 11 at one end, a combining portion 12 at the opposite end comprising a pivot hole 13 and a shear element combining hole 15, and a first handle 14 further attached to the first shear element 10;

a second shear element 20 having a blade portion 21 at one end, and a combining portion 22 at the opposite end comprising a shear element combining hole 23;

a handle shaft 30 axially positioned within a second handle 31 and having a combining portion 32 at one end which includes a pivot hole 33 thereon;

an effort-saving transmission assembly including a toothed block 41 fixed on one side of the combining portion 32 of the handle shaft 30, and a toothed hole 42 provided on the combining portion 22 of the second shear element 20, wherein the combining portion 22 of the second shear element 20 overlaps the combining portion 32 of the handle shaft 30 to make the toothed hole 42 enclose the toothed block 41 while the combining portion 12 of the first shear element 10 overlaps the combining portion 22 of the second shear element 20; a pivot member 35 piercing through the shell of the second handle 31, pivot holes 13, 33 of the first shear element 10 and the handle shaft 30 and being positioned between the toothed hole 42 and the toothed block 41; a shear element combining pin 16, piercing through the shear element combining hole 15, 23 of said first and second shear elements 10, 20; and a compression spring 60 provided between the first handle 14 and the second handle 31.

It is to be particularly described that said toothed block 41 is fastened to the side of the combining portion 32 of the handle shaft 30 by two positioning members 46. Said toothed hole 42 and toothed block 41 each has a tooth 411, 421 at one side correspondingly and said teeth 411, 421 can be engaged with each other in part. Further, in the toothed hole 42, the two sidewalls adjacent to said tooth 421 are herein relatively defined as a first retaining edge 422 and a second retaining edge 423. On the toothed block 41, the two sidewalls adjacent to said tooth 411 are herein relatively defined as a first block edge 412 and a second block edge 413. A first positioning recess 424, a second positioning recess 425 and a receiving corner 426 are provided at one side of the toothed hole 42 opposite to the side where the tooth 421 is positioned. A recess 414 is provided on the toothed block 41 at the side proximal to said first positioning recess 424 and second positioning recess 425. The block 41 further has a vertex 415 corresponding to said receiving corner 426. Subject to the operating states of the shears, the foresaid pivot member 35 may be held between the recess 414 and the first positioning recess 424 or between the recess 414 and the second positioning recess 425 of which the reason will be further illustrated below.

Figure 4:
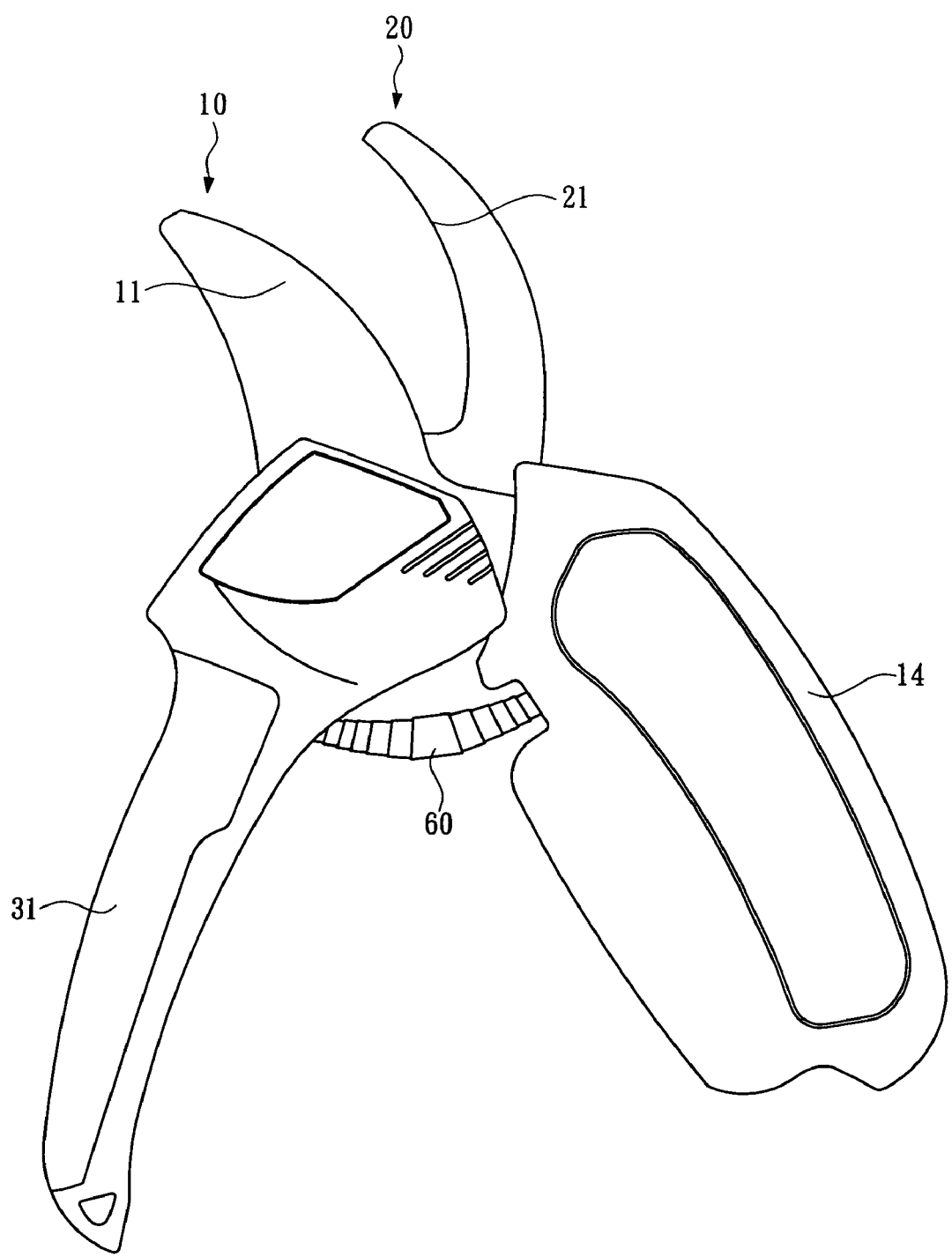
FIG. 4 is a plan view of the effort-saving shears according to the present invention showing the shears relatively reciprocally opening.
Figure 5:
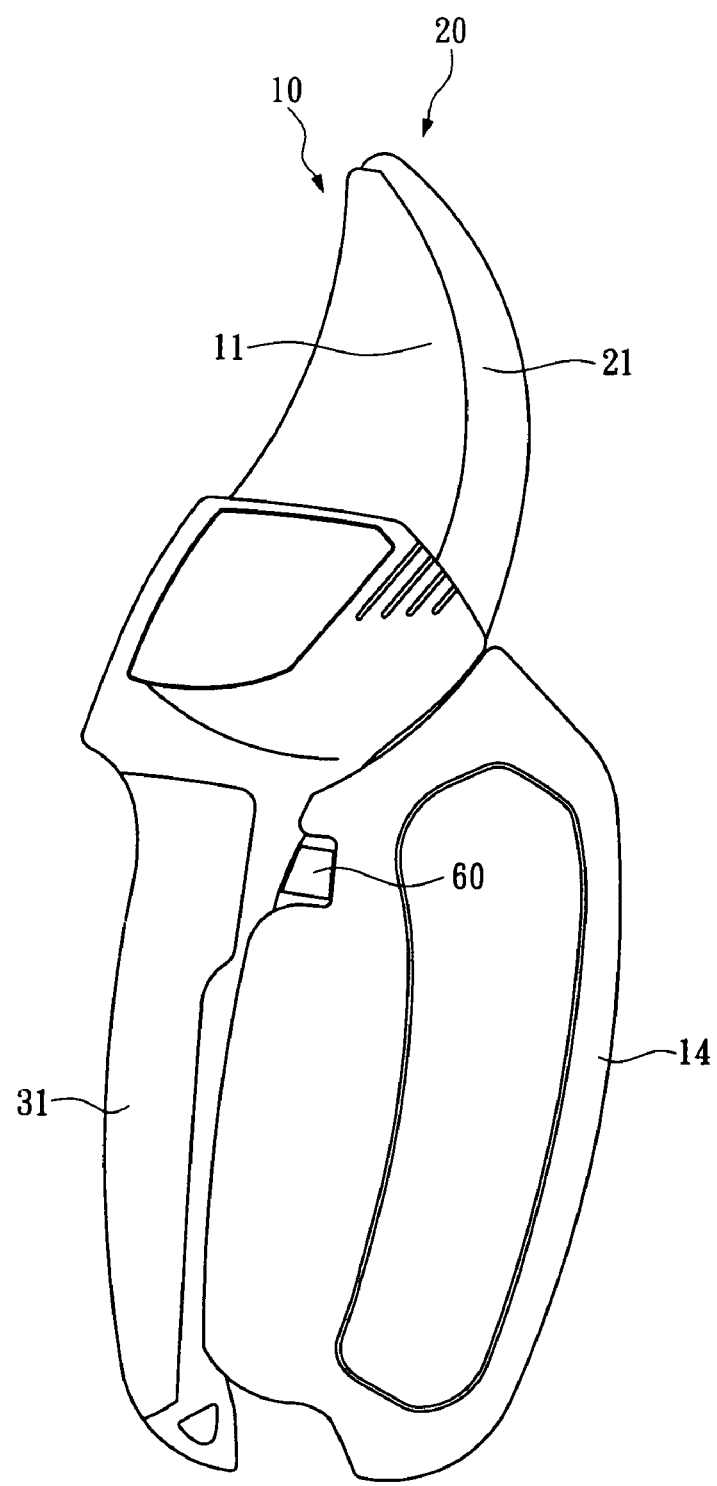
FIG. 5 is a plan view of the effort-saving shears according to the present invention showing the shears relatively reciprocally closed.

In FIGS. 4 and 5, the appearance of the exemplificative shears according to the present invention can be seen. The upper end of the second handle 31 is actually enveloping said effort-saving transmission assembly and the combining portions 12, 22 of the first and second shear element 10, 20 while it is to be clarified that the upper end of the second handle 31 is partially exploded in FIGS. 2 and 3 for clearly expressing the relationship among said components.

Figure 6:
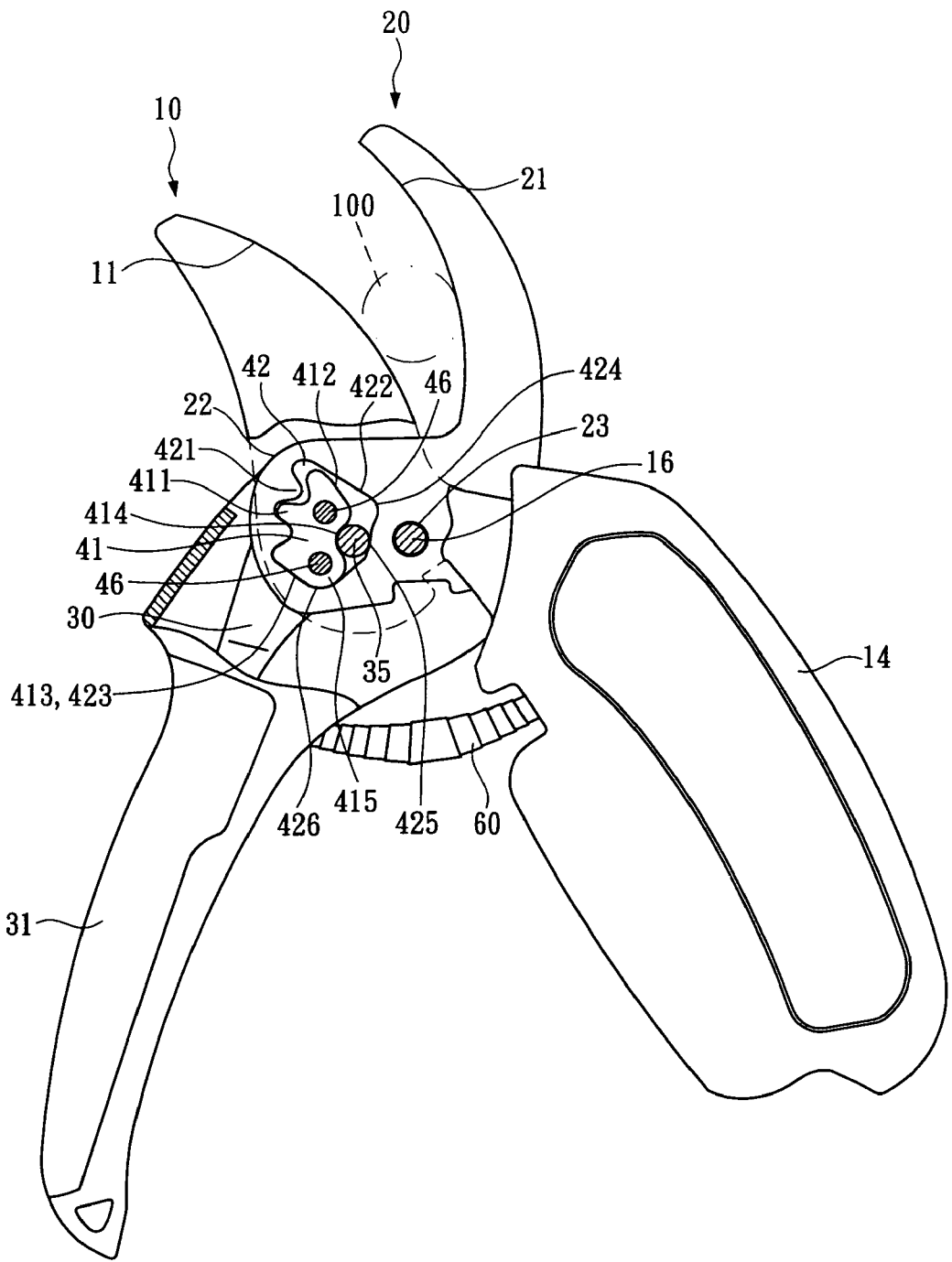
FIG. 6 is a first applied view of the effort-saving shears according to the present invention.
Figure 7:
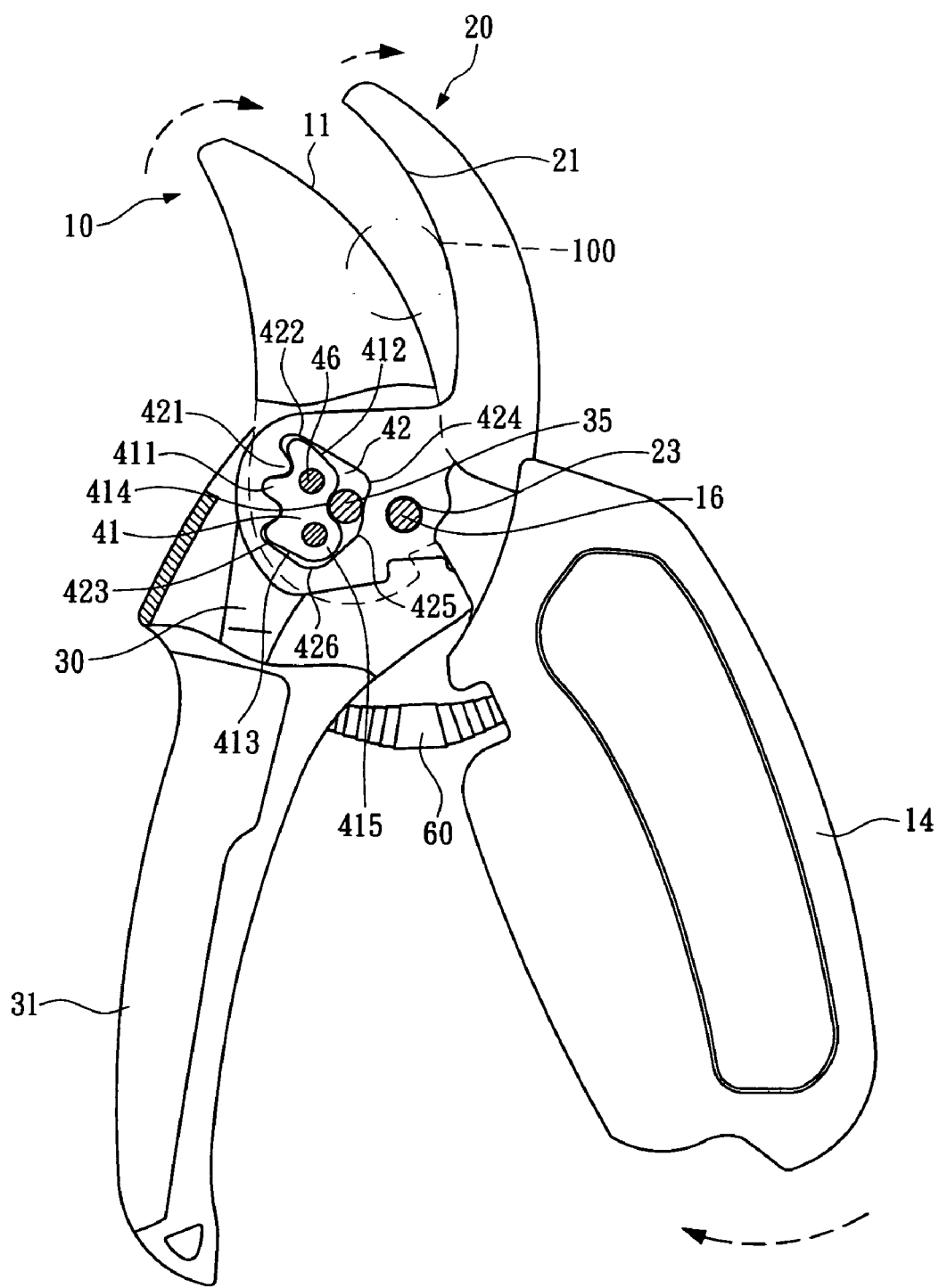
FIG. 7 is a second applied view of the effort-saving shears according to the present invention.
Figure 8:
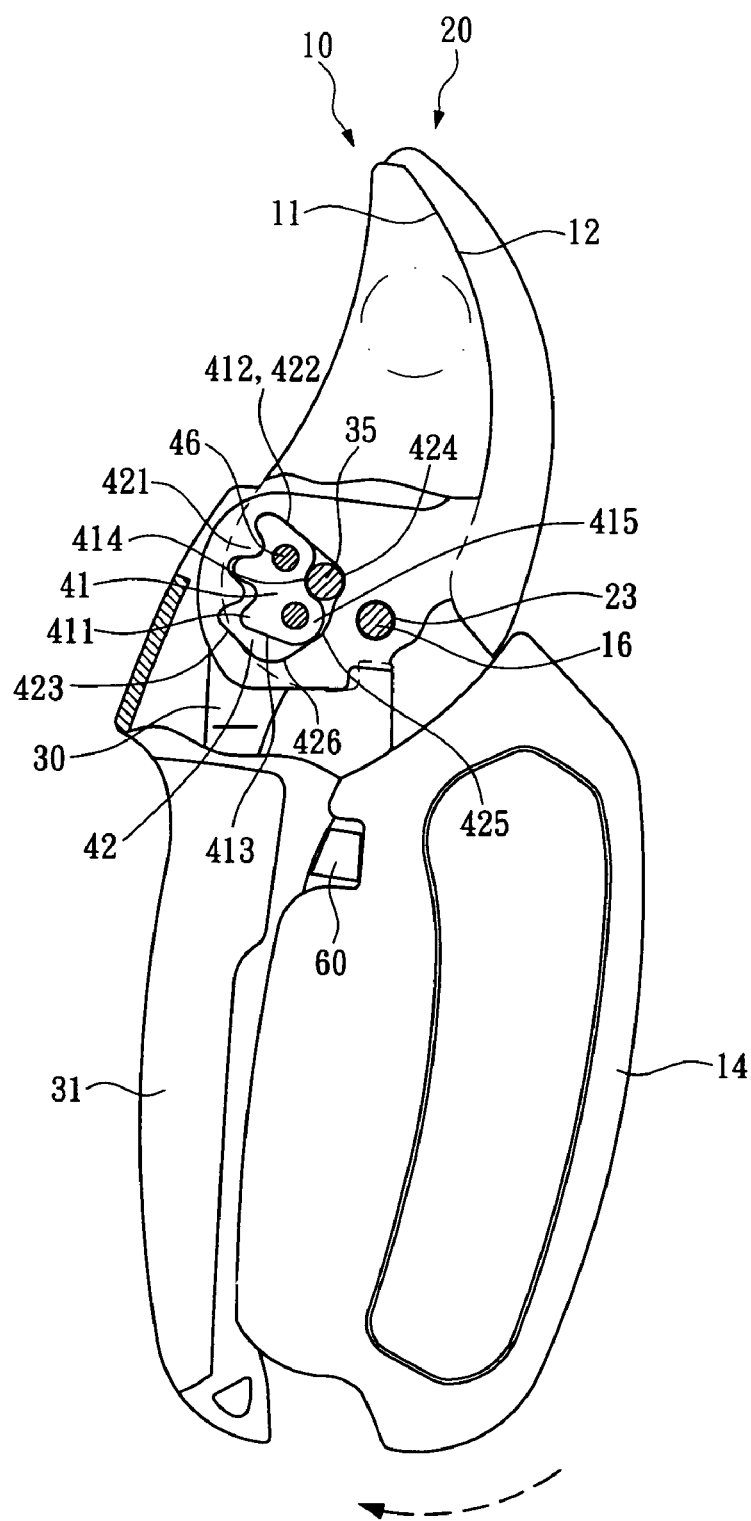
FIG. 8 is a third applied view of the effort-saving shears according to the present invention.

FIGS. 6, 7 and 8 are provided for illustrating the operation of the disclosed subject matter.

In FIG. 6, the shear elements are now relatively stretched for containing a branch 100 of a plant therebetween. Thus, the first and second handles 14, 31 appear apart; the pivot member 35 is positioned between the second positioning recess 425 and recess 414; the toothed block 41 and toothed hole 42 are partially engaged with part of the teeth 411, 421 thereof; the second block edge 413 of the toothed block 41 is pressing against the second retaining edge 423 of the toothed hole 42 and the vertex 415 of the toothed block 41 is received by the receiving corner 426 of the toothed hole 42. Under this status, the shear elements are now farthest extended.

In FIG. 7, when the first handle 14 and second handle 31 are squeezed toward each other, the first shear element 10 is pivoting on the pivot member 35 and the shear element combining pin 16 is drawing the second shear element 20 to slightly swing in a clockwise direction. Then the blade portion 11 of the first shear element 10 can cut into the branch 100 of the plant by a clockwise revolving movement.

Meantime, the swinging motion of the second shear element 20 causes a variation in the engagement of the teeth 411, 421 of the toothed block 41 and toothed hole 42. The first positioning recess 424 of the toothed hole 42 moves toward the pivot member 35 under the swinging of the second shear element 20, and the second positioning recess 425 of the toothed hole 42 moves toward the vertex 415 of the toothed block 41. The toothed block 41 and toothed hole 42 always remain mutually clenched in part under such variation.

In FIG. 8, the first handle 14 and second handle 31 are further squeezed toward each other and foresaid components are keeping moving until the branch 100 completely cut off by the blade portions 11, 21. At this time, the toothed block 41 and toothed hole 42 are engaged mutually with different parts of the teeth 411, 421 thereof; the first block edge 412 of the toothed block 41 is pressing on the first retaining edge 422 of the toothed hole 42; the vertex 415 of the toothed block 41 is received by the second positioning recess 425; the pivot member 35 is positioned between the recess 414 of the toothed block 41 and first positioning recess 424 of the toothed hole 42. Thus the first and second shear elements 10, 20 are at an extremely close position.

Using the disclosed shears to shear a branch or stem of a plant, the effort-saving transmission assembly moves as described in FIGS. 6, 7 and 8, so that the squeezing force acting on the first and second handles 14, 31 can be amplified on the first and second shear elements 10, 20 due to the engagement of the teeth. Therefore, comparing with conventional shears, the disclosed shears provide effortless operation. Since a user is permitted to operate the shears with less effort, the operation can be assured with stability, therefore, the undesirable sway, shakiness or deviation can be eliminated, and in turn the smooth cuts can be achieved.

Further, by using the disclosed shears to shear a branch or stem of a plant, due to the effect of the effort-saving transmission assembly, the pivot assembly 35 can be assured from damage caused by counterforce emitted from the branch. Therefore the closeness and shearing force between the two shear elements 10, 20 can be ensured.

Also, the effort-saving transmission assembly of the present invention restricts the full open and close angles of the shear elements and prevents the shear elements from excessive opening or improper closing by utilizing the engagement between the first block edge 412 and first retaining edge 422 as well as the second block edge 413 and second retaining edge 423.

Besides being a fulcrum where the shear elements pivot to open or close on, the pivot member 35 of the effort-saving transmission assembly has an additional function as a packing between the toothed hole 42 and tooth block 41 to make the teeth 411, 421 engage closely with each other so that the squeezing force acting on the handles 14, 31 can be efficiently transmitted to the first and second shear elements 10, 20.

Although a particular embodiment of the invention has been described in detail for purposes of illustration, it will be understood by one of ordinary skill in the art that numerous variations will be possible to the disclosed embodiments without going outside the scope of the invention as disclosed in the claims.

What is claimed is:

1. A pair of effort-saving shears primarily comprising:
    a first shear element having a first blade portion at one end, a combining portion at the opposite end comprising a pivot hole and a shear element combining hole, and a first handle further attached to the first shear element;
    a second shear element having a second blade portion at one end, and a combining portion at the opposite end comprising a shear element combining hole;
    a handle shaft axially positioned in a second handle having a pivot hole and having a combining portion at one end;
    an effort-saving transmission assembly including a toothed block fixed on one side of the combining portion of the second shear element, the toothed block having two side walls, and a toothed hole having at least two side walls provided on the combining portion of the second shear element, wherein the toothed hole and toothed block each have a tooth respectively, and wherein the combining portion of the second shear element overlaps the combining portion of the handle shaft to make the toothed hole enclose and partially engage the toothed block by parts of the teeth thereof, while the combining portion of the first shear element overlaps the combining portion of the second shear element;

a pivot member, piercing through the pivot holes of the first shear element and the handle shaft to be placed between the toothed hole and the toothed block far from said teeth; and a shear element combining pin piercing through the shear element combining holes of the first and second shear elements wherein, the at least two sidewalls of the toothed hole adjacent to said tooth of the toothed hole are a first retaining edge and a second retaining edge while the two sidewalls of the toothed block adjacent to said tooth of the toothed block are a first block edge and a second block edge so that when the first and second shear elements are opened at a predetermined angle, the second block edge of the toothed block presses on the second retaining edge of the toothed hole; when the first and second shear elements are closed, the first block edge of the toothed block presses on the first retaining edge of the toothed hole wherein, a first positioning recess, and a second positioning recess are provided at one side of the toothed hole opposite from the tooth; and a recess is provided on the toothed block at the side far from the tooth; so that when the first and second shear elements are opened at a predetermined angle, the pivot member is held between the recess and second positioning recess; when the first and second shear elements are closed, the pivot member is held between the recess and first positioning recess.

2. The effort-saving shears as claimed in claim 1, wherein, the toothed hole has a receiving corner adjacent to the second retaining edge and opposite to the tooth thereof and the toothed block has a vertex so that when the first and second shear elements are opened at a predetermined angle, the vertex is received by the receiving corner; when the first and second shear elements are closed, the vertex is received by the second positioning recess.

* * * * *